April 18, 1933.   D. PARRETT   1,903,914
VARIABLE SPEED TRANSMISSION
Filed Oct. 30, 1930   3 Sheets-Sheet 1

Inventor
Dent Parrett
By Bacon & Thomas
Attorneys

Patented Apr. 18, 1933

1,903,914

UNITED STATES PATENT OFFICE

DENT PARRETT, OF ST. JOSEPH, MICHIGAN, ASSIGNOR TO JOSEPH GOSSNER AND MATHIAS LEUPOLD, OF NEW YORK, N. Y.

VARIABLE SPEED TRANSMISSION

Application filed October 30, 1930. Serial No. 492,251.

This invention relates to improvements in variable speed transmissions.

An important object of the invention is to provide a transmission of the variable speed type which is especially adapted for use in tractors or with other mechanism where a direct drive is not essential.

Another object of the invention is to provide a variable speed transmission suitable for use in a vehicle of the four-wheel drive type; i. e., a vehicle having two sets of drive wheels.

A further object of the invention is to provide a variable speed transmission wherein different gear ratios readily may be provided for certain speeds.

Still another object of the invention is to provide an auxiliary power take-off shaft in the transmission assembly.

Other objects and advantages of the invention will be apparent during the course of the following description.

Figure 1:
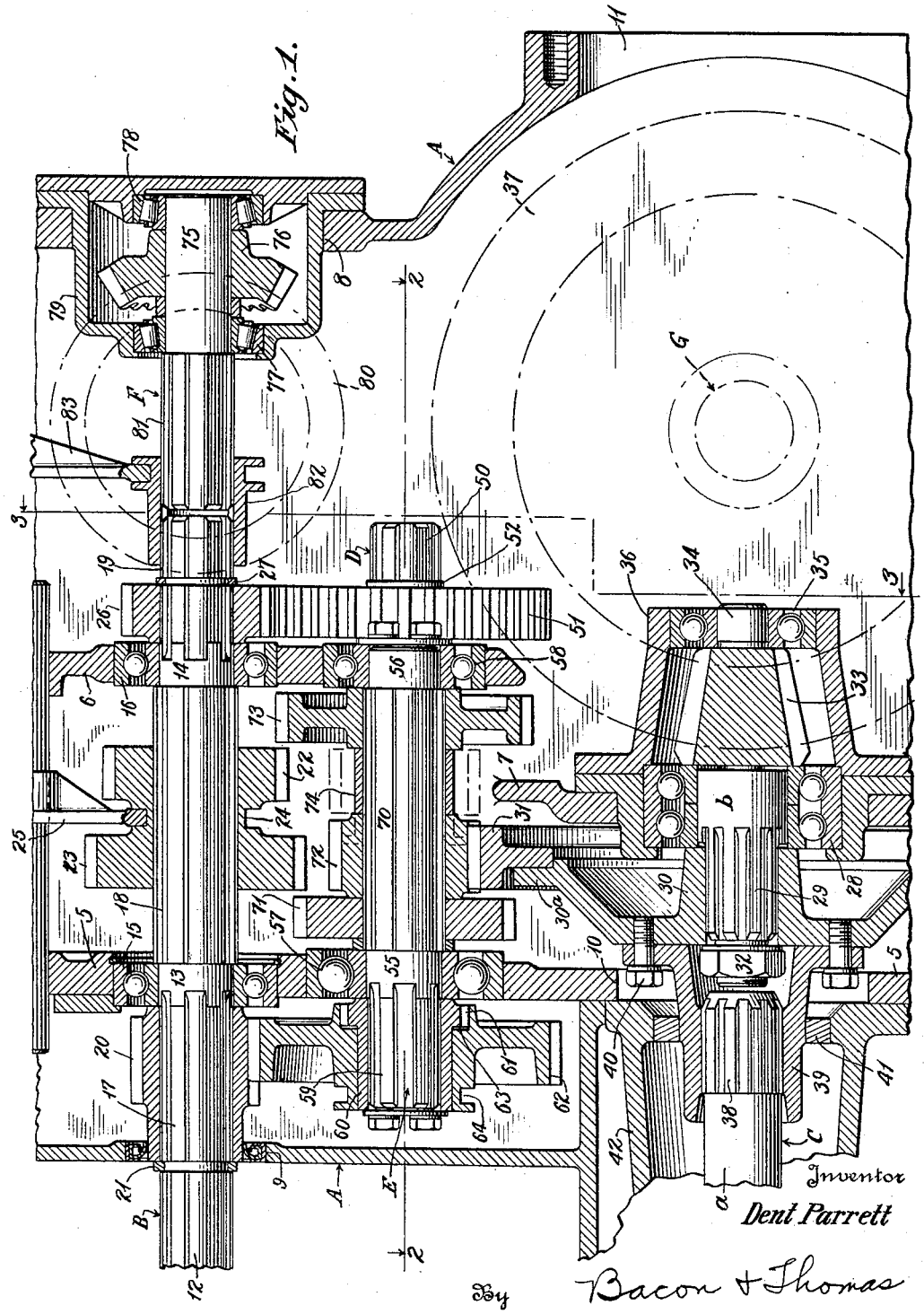
Figure 2:
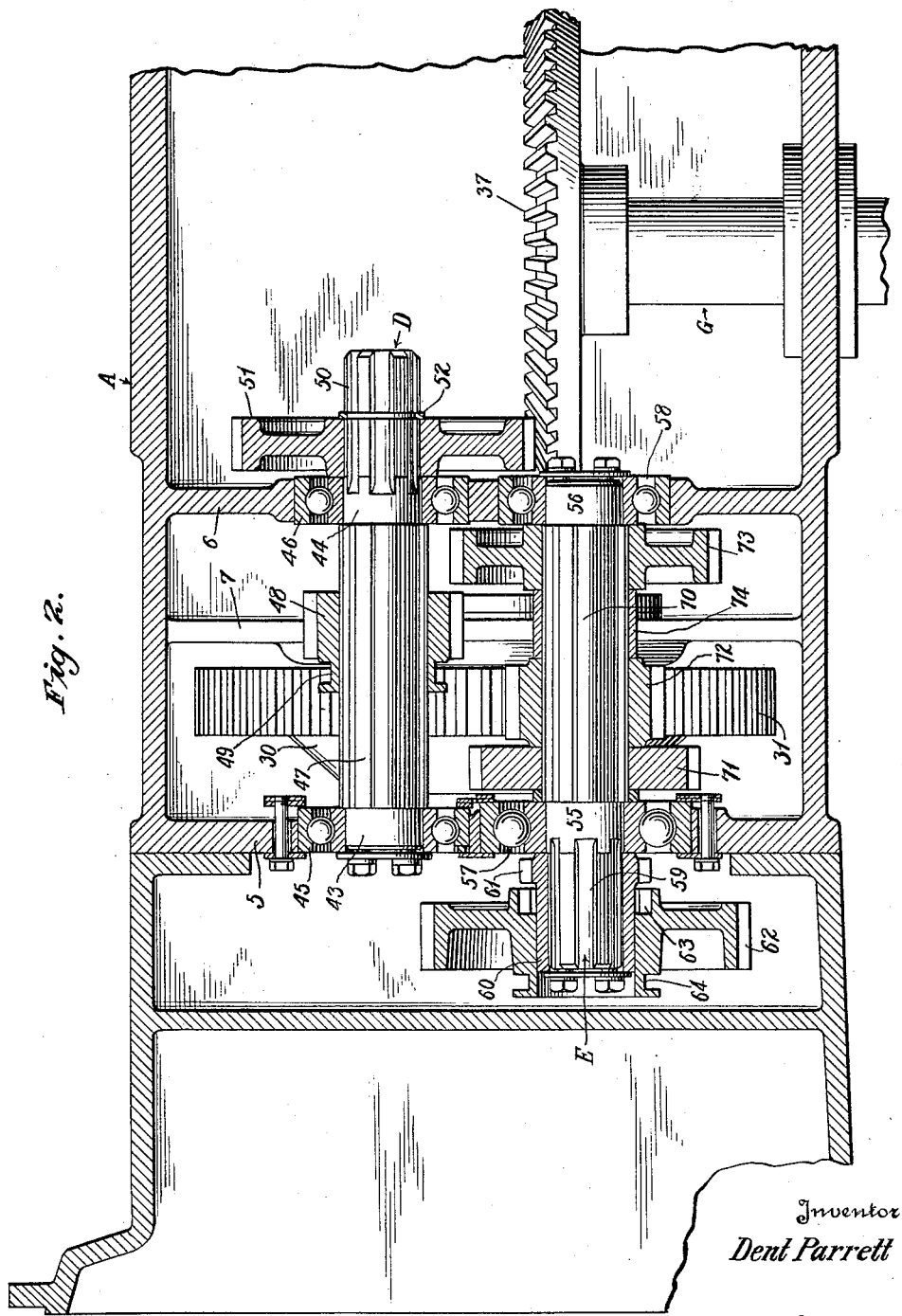
Figure 3:
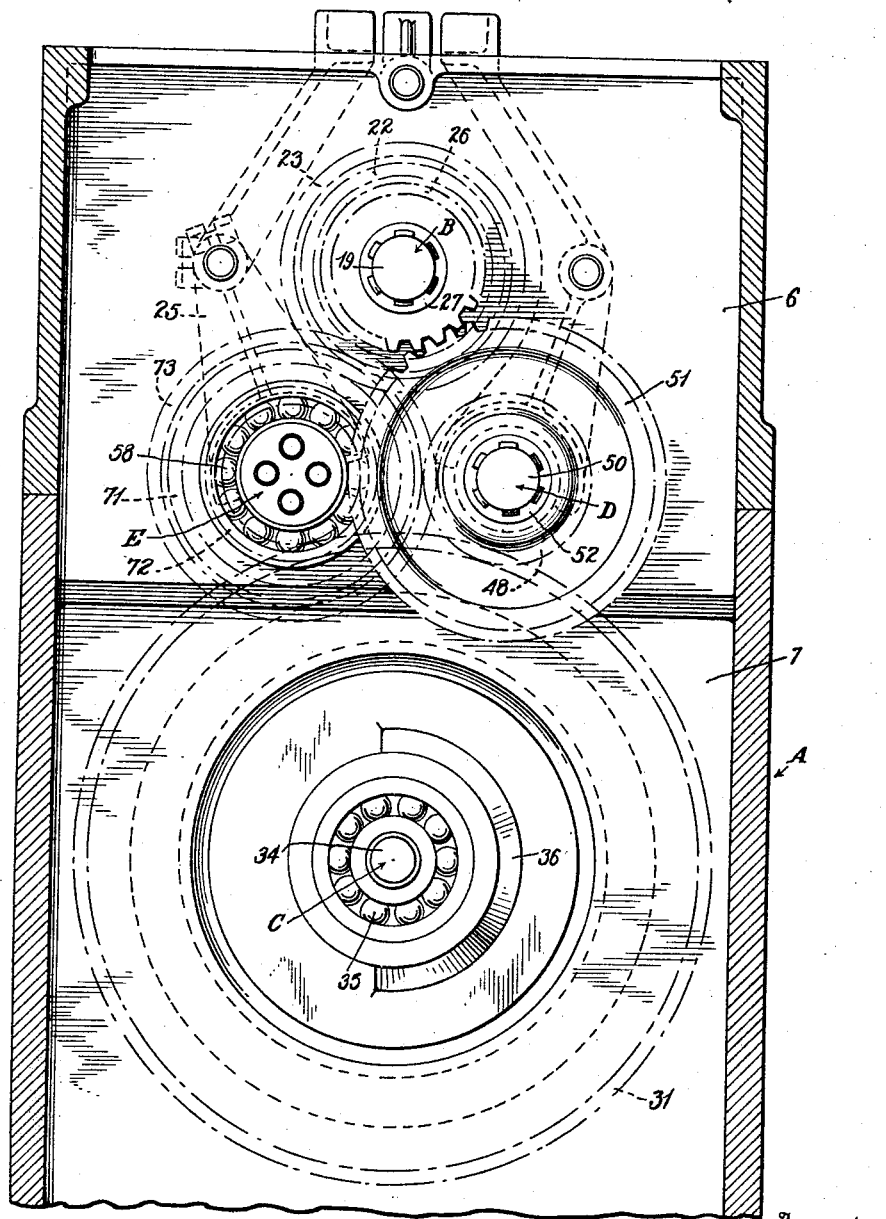

In the accompanying drawings forming a part of this specification and in which like numerals are employed to designate like parts throughout the same;

Fig. 1 is a vertical sectional view of the variable speed transmission employed in this invention, Fig. 2 is a horizontal sectional view taken upon lines 2—2 of Fig. 1, and Fig. 3 is a vertical sectional view taken one lines 3—3 of Fig. 1 or at right angles to the vertical view set forth in Fig. 1.

The structural features of the invention and the mode of operation first will be described briefly to enable those skilled in the art to quickly arrive at an understanding of the invention. The transmission includes a suitable housing or casing A which encloses the various shafts, gears, and the like of the transmission. A drive shaft B is suitably supported within the housing or casing A and is connected at one end to the prime mover or source of power. A driven shaft assembly C is suitably mounted in the casing or housing A and is to be driven in forward or reverse directions and at various relative speeds by the various gear trains embodied in the transmission. These gear trains are carried in part by the drive shaft B and the driven shaft assembly C. The remainder of the gear trains are carried by a pair of countershafts D and E. The driven shaft assembly C is rotated in one direction, which will be considered as the forward direction if the transmission is used in a motor vehicle, by the gear trains associated with both the countershafts D and E. Several of the forward speeds are accomplished by utilizing the countershaft E while one of the forward speeds is accomplished by utilizing the countershaft D. To obtain a rotation of the driven shaft assembly in the reverse direction, both of the countershafts D and E are made use of.

An auxiliary power take-off assembly F is associated with the transmission and is selectively connected directly to the drive shaft B by means of a clutch device. This auxiliary power take-off assembly is suitably supported by the casing or housing A.

This transmission is especially adapted for use in a vehicle of the four-wheel drive type; i. e., a vehicle having at least two sets of driving wheels generally positioned one set adjacent each end of the vehicle. For this reason, the driven shaft assembly includes a forwardly extending shaft section $a$ and a rearwardly extending shaft section $b$. The transmission, if used in a tractor, preferably is located so that the rear axle, represented in a general way by the shaft G, may be directly driven from the rearwardly extending stub shaft or driven shaft section $b$.

The detail features of construction now will be very specifically described.

The casing or housing A may take any desired form and for this reason it is not disclosed in its entirety. Preferably, this casing or housing is provided with a plurality of bearing supporting partitions 5, 6 and 7. An opening 8 is formed in one of the exterior walls of the casing for removably receiving a portion of the auxiliary power take-off assembly which will be described in detail at a later point. Another opening 9 is provided in the exterior wall of the casing for permitting the drive shaft B to project from the casing for connection with the prime mover or source of power. An opening 10 is provided in the casing for permitting the forwardly extending driven shaft section $a$ to extend to the front axle assembly if the transmission is used on a vehicle of the four-wheel drive type. An inspection opening 11 is provided in the rear wall portion of the casing. This latter opening will, of course, be provided with a suitable cap or closure not shown.

The drive shaft B has an end portion 12 which is suitably splined for receiving a coupling member by means of which the shaft may be connected to the source of power, such as the crank shaft of an internal combustion engine if the device is to be used on a land vehicle. The coupling element, not shown, to be attached to the projecting end 12 of the drive shaft may take the form of one of the elements of a clutch. This drive shaft is formed with two bearing portions 13 and 14 which register with the partitions 5 and 6. Suitable bearings 15 and 16 are positioned in apertures formed in the partitions 5 and 6 and function to rotatably support the drive shaft B. This shaft is formed with three splined portions 17, 18 and 19. Mounted upon the splined portion 17 is a pinion gear 20 which is held against axial movement by the bearing 15 at one end and the ring or collar 21 at the remaining end. This pinion gear 20 is splined to the portion 17 of the drive shaft. Longitudinally slidably splined to the section 18 of the drive shaft is a compound gear including the smaller gear 22 and the larger gear 23. A shifter groove 24 is formed between these gears 22 and 23 and is adapted for receiving the shifter fork 25. The splined portion 19 of the drive shaft B has splined thereto the pinion 26 which is fixed against axial movement by engagement with the bearing structure 16 at one end and the retaining ring or collar 27 at the other end.

The driven shaft assembly includes the rearwardly extending stub shaft portion $b$ which is supported by a bearing structure 28 in the partition 7. This stub shaft $b$ is formed with a splined end portion 29 to which is secured the hub 30 of a ring gear 31. This hub portion 30 is splined to the stub shaft $b$ and is retained against axial movement with respect to this shaft by the nut and washer 32 and the bearing 28. The driven shaft section $b$ further is provided with a beveled pinion 33 having at its outer end a reduced journal 34 rotatably supported by the bearing structure 35. This bearing structure is carried by the outer end of a detachable housing member 36 which, as illustrated in Fig. 3, is of semi-conical formation, one side of the same being cut away to permit the beveled pinion 33 to project therefrom for meshing with the beveled ring gear 37 carried by the rear axle drive shaft G. This rear axle drive shaft G is merely illustrative and may actually be the rear axle itself. In any event, the shaft G forms the connection or a part of the connection between the rear driven shaft section $b$ and the rear wheels of the vehicle equipped with this transmission.

The forwardly extending driven shaft section $a$ is formed with a splined portion 38 to which is splined the hub portion 39 of the ring gear 31. This hub portion is secured to the hub portion 30 by screws or the like 40. It will be noted that the ring gear 31 is fixedly connected to both of the driven shaft sections $a$ and $b$ by the hub portions 39 and 30 respectively. The ring gear 31 may be connected to the radially extending flange portion 30a of the hub portion 30 in any desired manner. The hub portion 39 is supported at 41 in a forwardly projecting casing portion 42 which enables the shaft section $a$ to project forwardly to the driven front axle of the vehicle.

The countershaft D is provided with two bearing portions 43 and 44 which are rotatably supported by the anti-friction ball bearing devices 45 and 46 respectively. These bearing devices are suitably mounted in the partitions 5 and 6 of the transmission housing or casing A. This countershaft D is formed with a relatively long splined section 47 upon which is slidably fixed the pinion 48. This splined construction causes the pinion 48 to rotate with the countershaft D but permits longitudinal shifting movement of this pinion. A shifter yoke receiving groove 49 is formed in the pinion 48 for the purpose of permitting this pinion to be manually controlled by a suitable shifter mechanism. A second splined portion 50 is formed on the countershaft D and has affixed thereto for rotation with the countershaft a gear 51. It will be noted by inspecting Figs. 1 and 3 that this gear 51 constantly meshes with the pinion 26 carried by the drive shaft B. The gear 51 is retained in place by the ring or collar 52. It will be noted that the gear 51 and the pinion 26 may readily be removed from the countershaft D and the drive shaft B, respectively, by merely removing the retaining collars or rings 52 and 27. In the case of the pinion 26, the auxiliary power take-off assembly F also will have to be removed from the casing or at least moved away from the inner end of the drive shaft B to permit the pinion 26 to be slipped off of the end of this drive shaft. These members, 51 and 26, are removably connected to either shaft for the purpose of permitting them to be readily interchanged so that the driving ratio between the shaft B and the countershaft D may be changed. It will be noted that the countershaft D, with the pinion 26 and gear 51 positioned upon the drive shaft B and the countershaft D respectively will be driven at a reduced speed with respect to the drive shaft. By reversing the pinion and gear, the countershaft will be driven at a greater speed than the drive shaft.

The countershaft E is formed with a smooth bearing portion 55 adjacent one end and a smooth bearing portion 56 at its remaining end. These bearing portions are received within the anti-friction bearing devices 57 and 58, respectively, which bearing devices are supported by the partitions 5 and 6 of the casing or housing A. One end of the countershaft E projects forwardly of the partition 5 and is splined as at 59. Fixed on this splined portion for rotation with the countershaft is a clutch sleeve 60 having clutch teeth 61 at one end thereof. Loosely mounted upon this clutch sleeve is a gear 62 having clutch teeth 63 adapted for cooperating with the clutch teeth 61 on the clutch sleeve 60. The gear 62 is formed with a shifter yoke receiving groove 64 by means of which the gear may be shifted longitudinally of the countershaft for connecting and disconnecting it with respect to the fixed clutch sleeve 60. It will be noted by inspecting Fig. 1 that the fixed pinion 20 carried by the splined portion 17 of the drive shaft B is of greater width than the gear 62 and constantly meshes with this gear. The relative widths of the pinion and gear enable the same to be kept in mesh during the longitudinal shifting movement of the gear 62. The countershaft E further is formed with a splined portion 70 upon which the gears 71, 72 and 73 are fixed. These gears are splined to the countershaft E for constant rotation therewith. A spacer sleeve 74 encircles the splined portion 70 of the countershaft for retaining the gears 72 and 73 in proper spaced relation. It will be noted that the gear 72 constantly meshes with the ring gear 31 of the driven shaft assembly C.

The auxiliary power take-off shaft assembly F includes a stub shaft 75 to which is suitably keyed the beveled pinion 76. This pinion will constantly rotate with the shaft 75. Anti-friction bearings 77 and 78 rotatably support the stub shaft 75 within the two-part removable casing 79 which is secured to the transmission housing A within the opening 8. The inner part of this housing 79 is formed with a suitable opening to permit the teeth of the beveled pinion to mesh with beveled gear 80 shown in dot and dash lines. It is to be understood that this bevel gear 80 is carried by and is suitably secured to a shaft which projects from the housing A. The outer end of the shaft, not shown, connected to the bevel gear 80 may have any suitable form of driving connection, such as a pulley, fixed to its outer end. The countershaft 75 is formed with a splined section 81 arranged in axial alinement with the drive shaft B. A clutch sleeve or coupling member 82 is internally splined for sliding movement upon the end 81 of the countershaft. In Fig. 1, the clutch sleeve or coupling member 82 is illustrated in position to directly couple the shaft 75 to the drive shaft B through the medium of the splined portion 19 of this drive shaft. The coupling member 82 may be moved longitudinally of the shaft 75 by the shifter fork 83 until the sleeve 82 is moved out of engagement with the splined end of the drive shaft. The power take-off shaft 75 then will be disconnected from the drive shaft.

The mode of operation of this transmission now will be described in detail.

It first will be noted that the countershaft D will be driven at a constant speed at all times the drive shaft B is rotating, due to the constant meshing of the pinion 26 with the gear 51. It also will be noted that the countershaft E is at all times connected with the driven shaft assembly C due to the constant meshing of the pinion 72 with the ring gear 31.

To obtain first speed, the gear 62 is moved from the position illustrated in Fig. 2 to the position illustrated in Fig. 1, or with the clutch teeth 61 and 63 meshing. The drive then will be from the drive shaft B through the pinion 20 to the gear 62 fixed to the countershaft E by the clutch structure and from the countershaft E through the pinion 72 to the ring gear 31. This ring gear is positively connected to the sections a and b of the driven shaft assembly. To obtain second speed, the gear 62 is first shifted longitudinally to disconnect it from the countershaft E and the pinion 48 on the countershaft D then is moved longitudinally until it fully meshes with the ring gear 31. The drive is then from the drive shaft B through the pinion 26 to the gear 51, which is fixed to the countershaft D and from the countershaft through the sliding pinion 48 to the ring gear 31. To obtain third speed, the pinion 48 is first shifted longitudinally out of mesh with the ring gear 31 and then the compound gear carried by the drive shaft is shifted longitudinally to cause the gear element 22 to mesh with the gear 73 on the countershaft E. This gear 73 is fixed with respect to the countershaft and the drive then will be from the drive shaft B through the gear element 22 to the gear 73, from this gear to the countershaft E and from the gear 72 upon its countershaft to the ring gear 31. Fourth speed may be obtained by shifting the compound gear longitudinally in the opposite direction on the drive shaft B until the gear element 23 meshes with the gear 71. The drive then will be from the drive shaft B through the gear element 23 to the gear 71 fixed on the countershaft E and from this countershaft through the gear 72 to the ring gear 31. To obtain a drive in the reverse direction, the pinion 48 is shifted longitudinally of the neutral position illustrated in Fig. 2 until it meshes with the gear 73 fixed to the countershaft E. The drive then will be from the drive shaft B through the pinion 26 and gear 51 to the countershaft D and from this countershaft through the pinion 48 to the gear 73 fixed on the countershaft E and from the countershaft through the gear 72 to the ring gear 31.

It will be noted that three forward speeds are obtained by connecting the countershaft E to the drive shaft B, while one forward speed is obtained by connecting the countershaft D to the ring gear carried by the driven shaft assembly, which forward speed is obtained independently of the countershaft E. The drive in the reverse direction is obtained by interconnecting both of the countershafts and driving from the drive shaft B first to the countershaft D and from this countershaft to the countershaft E which is constantly connected to the ring gear 31 of the driven shaft assembly. The countershaft D idly rotates when the drive is from the drive shaft B to the driven shaft assembly C through the countershaft E. The countershaft E rotates idly, due to its constant connection with the driven shaft assembly, when the driven shaft is being rotated in second speed due to the meshing of the pinion 48 with the ring gear 31. The rear axle drive shaft G, of course, will rotate at all periods of rotation of the driven shaft assembly.

Whenever it is desired to obtain an auxiliary power take-off, the clutch element 82 is shifted into the operative position illustrated in Fig. 1 for directly coupling the shaft 75 to the drive shaft B. During all other periods of operation, the clutch element 82 is positioned out of engagement with the splined end 19 of the drive shaft B.

It is to be understood that the form of this invention herein shown and described is to be taken as a preferred example of the same, and that various changes in the shape, size, and arrangement of parts may be resorted to without departing from the spirit of the invention or the scope of the subjoined claims.

Having thus described the invention, I claim:

1. A transmission of the type described comprising a drive shaft, a driven shaft, a countershaft continuously driven by the drive shaft at a constant speed, means for driving the driven shaft from the countershaft in opposite directions, a second countershaft, means for driving the second countershaft from the drive shaft at different speeds, and means for driving the driven shaft from the second countershaft.

2. A transmission of the type described comprising a drive shaft, a driven shaft, a pair of countershafts, a gear on the driven shaft, a gear on one of the countershafts constantly meshing with the gear on the driven shaft, means for driving such countershaft at different speeds from the drive shaft, means for continuously driving the second countershaft from the drive shaft, and means on the second countershaft for driving the driven shaft either through the constantly meshing gears or by meshing with the gear on the driven shaft independently of the first mentioned countershaft.

3. A transmission of the type described comprising a drive shaft, a driven shaft, a pair of countershafts, a gear on the driven shaft, a gear on one of the countershafts constantly meshing with the gear on the driven shaft, gear means for driving such countershaft at different speeds from the drive shaft, means for driving the second countershaft from the drive shaft at a constant speed, and means movable between two positions on the second countershaft for driving the driven shaft while in one position in one direction through said constantly meshing gears or while in the second position in the opposite direction through the driven shaft independently of the first mentioned countershaft.

4. A transmission of the type described comprising a drive shaft, a pair of parallel countershafts, a driven shaft located beneath said countershafts, a constant connection between one of said countershafts and the drive shaft, means for selectively driving the driven shaft from such countershaft in opposite directions, a constant driving connection between the second countershaft and the driven shaft, and selectively operable variable speed driving connections between the drive shaft and the second countershaft.

5. A transmission of the type described comprising a drive shaft, a pair of driven shaft sections, a gear connected to both of the driven shaft sections, a countershaft, a gear on the counter shaft constantly meshing with the gear connected to the driven shaft sections, means for selectively driving the countershaft from the drive shaft at several different forward speeds and in a reverse direction, and means independent of the countershaft for selectively driving the driven shaft sections from the drive shaft at one additional forward speed.

6. A transmission of the type described comprising a drive shaft, a driven shaft assembly including a driven gear and adapted to deliver power in opposite directions, two countershafts, means for driving the driven shaft from the drive shaft through said gear in one direction selectively through either of said countershafts, and means for driving the driven shaft from the drive shaft through said gear in the opposite direction through both of said countershafts.

7. A transmission of the type described comprising a drive shaft, a driven shaft assembly arranged parallel with the drive shaft and adapted to deliver power from both ends, said assembly including a driven gear, two countershafts, means for driving the driven shaft from the drive shaft through said gear at different speeds in one direction through one of the countershafts and at an additional speed in the same direction through the other countershaft, and means for driving the driven shaft from the drive shaft through said gear in the opposite direction through both of said countershafts.

8. A transmission of the type described comprising a drive shaft, a driven shaft directly underlying the drive shaft, a pair of countershafts positioned between the drive and driven shafts, and means for driving the driven shaft from the drive shaft through either of the countershafts.

9. A transmission of the type described comprising a drive shaft, a driven shaft directly underlying the drive shaft, a pair of countershafts positioned between the drive and driven shafts, and means for driving the driven shaft from the drive shaft selectively through either or both of the countershafts.

10. A transmission of the type described comprising a drive shaft, a driven shaft assembly adapted to deliver power at two different points and positioned beneath the drive shaft, a pair of countershafts positioned between the drive and driven shafts, and means for driving the driven shaft from the drive shaft selectively through either of the countershafts in one direction and through both of the countershafts in the opposite direction.

11. A transmission of the type described comprising a drive shaft having two pinions splined thereon and held against axial movement and a compound gear structure splined thereon and capable of axial movement, a countershaft having a gear splined thereon and constantly meshing with one of the fixed pinions on the drive shaft, a second countershaft, a driven shaft, means for constantly connecting the second countershaft to the driven shaft, a loose gear on the second countershaft constantly meshing with the second fixed pinion on the drive shaft, clutch means for selectively connecting and disconnecting said loose gear with the second countershaft, a pair of fixed gears carried by the second countershaft, means for shifting the compound gear carried by the drive shaft into mesh with either of said pair of fixed gears carried by the second countershaft, and means for selectively connecting the first mentioned countershaft either to the second mentioned countershaft or to the driven shaft independently of said second mentioned countershaft.

12. A transmission of the type described comprising a drive shaft, a driven shaft, a pair of countershafts, means for constantly connecting the drive shaft to one of the countershafts, means for constantly connecting the second countershaft to the driven shaft, means for selectively driving the second mentioned countershaft at various speeds in a forward direction from the drive shaft, and means carried by the first mentioned countershaft for selectively driving the driven shaft in a forward direction independent of the second mentioned countershaft or for driving the driven shaft in a reverse direction through the second mentioned countershaft.

13. A transmission of the type described comprising a drive shaft, a pair of countershafts positioned beneath the drive shaft and arranged laterally of opposite sides thereof, means for constantly driving one of the countershafts from the drive shaft at a fixed speed, means for selectively driving the second countershaft from the drive shaft at different speeds, a driven shaft, means for driving the driven shaft in one direction at various speeds through either of the countershafts, and means for driving the driven shaft in a reverse direction through both of the countershafts.

14. A transmission of the type described comprising a drive shaft, a countershaft continuously driven from the drive shaft at a constant speed ratio, a second countershaft selectively driven from said drive shaft at a plurality of different speed ratios, a driven shaft selectively receiving power from either of said countershafts.

15. A transmission of the type described comprising a drive shaft, a countershaft continuously driven from the drive shaft at a constant speed ratio, a second countershaft selectively driven from said drive shaft at a plurality of different speed ratios, a driven shaft assembly including two shaft sections, means for connecting said shaft sections, and means for selectively delivering power to said connecting means from either of said countershafts.

16. A transmission of the type described comprising a drive shaft, a countershaft continuously driven from the drive shaft at a constant speed ratio, a second countershaft selectively driven from said drive shaft at a plurality of different speed ratios, a driven shaft assembly including two shaft sections, both of which deliver power from the transmission, and means for selectively driving the driven shaft assembly from the drive shaft through either of said countershafts.

In testimony whereof I affix my signature.

DENT PARRETT.